United States Patent [19]

Wagner et al.

[11] 4,000,849
[45] Jan. 4, 1977

[54] TEMPERATURE RESPONSIVE VALVE

[75] Inventors: Joseph P. Wagner; Everett T. Steele, Jr., both of Knoxville, Tenn.

[73] Assignee: Robertshaw Controls Company, Richmond, Va.

[22] Filed: Jan. 20, 1975

[21] Appl. No.: 542,621

Related U.S. Application Data

[63] Continuation-in-part of Ser. No. 312,530, Dec. 6, 1972, abandoned, which is a continuation-in-part of Ser. No. 221,557, Jan. 28, 1972, abandoned.

[52] U.S. Cl. .............................. 236/100; 137/595; 236/86; 251/DIG. 1
[51] Int. Cl.$^2$ ..................................... G05D 23/12
[58] Field of Search ............. 123/117 A; 236/101, 236/100, 86; 137/625.18, 594, 595, 625.27, 625.5; 251/333, 339, 322, DIG. 1, 332

[56] References Cited

UNITED STATES PATENTS

| 2,700,983 | 2/1955 | Bryant .......................... 251/DIG. 1 |
| 3,318,333 | 5/1967 | McCollum et al. ............ 137/625.69 |
| 3,738,571 | 6/1973 | Elmer ............................ 236/100 |

*Primary Examiner*—William E. Wayner
*Assistant Examiner*—William E. Tapolcai, Jr.
*Attorney, Agent, or Firm*—Anthony A. O'Brien

[57] ABSTRACT

A temperature responsive valve for controlling communication between multiple ports is disclosed in three embodiments. In a first embodiment first and second adjacent chambers in a valve body are separated by a valve and second and third adjacent chambers in the body are separated by a second valve. The valves include a common stem carrying movable valve elements for simultaneously opening and closing the same. A sliding seal between the second and third chambers isolates these chambers for all positions of the valve stem. In a second embodiment there is also a fifth chamber communicating with a fifth port, a third valve is between the fourth and fifth ports, and a third valve element on the stem communicates the fourth port with the fifth port as the third port is closed relative to the fourth port. In a third embodiment first and second adjacent chambers in a valve body are separated by a valve seat which is selectively closed by a thermally actuated valve stem carrying movable valve elements. In all embodiments, the stem is moved by a fusion type thermal element so that the valve is transferred from a first position to a second position at a predetermined temperature. The valve is particularly useful for controlling communication between vacuum actuated devices of an internal combustion engine.

20 Claims, 8 Drawing Figures

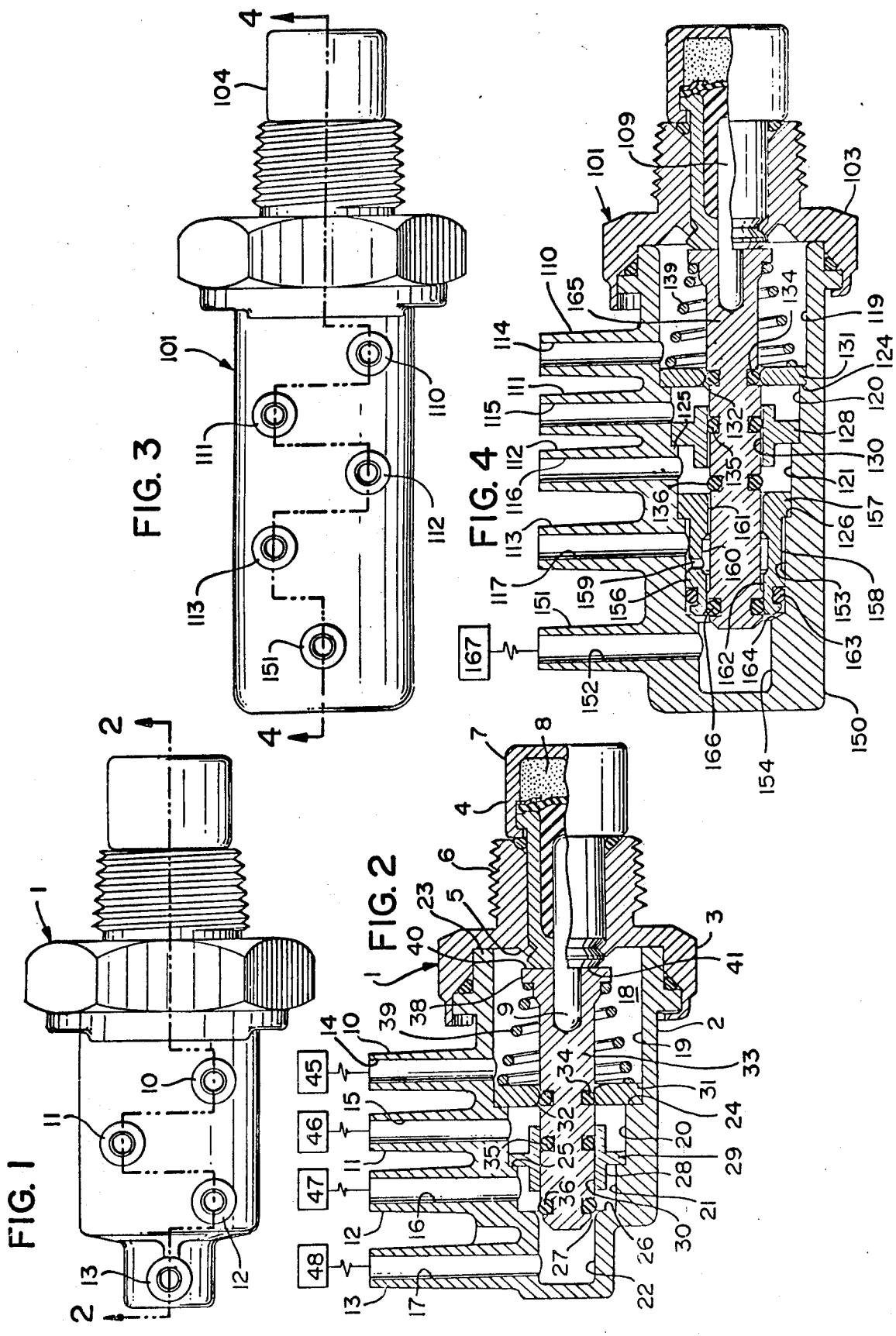

TEMPERATURE RESPONSIVE VALVE

CROSS REFERENCE TO RELATED APPLICATIONS

The present application is a continuation-in-part application of pending application Ser. No. 312,530, now abandoned, filed Dec. 6, 1972 as a continuation-in-part of our application Ser. No. 221,557, filed Jan. 28, 1972, now abandoned.

BACKGROUND OF THE INVENTION

1. The Field of Invention

The present invention relates to multiple port temperature responsive values and in particular to values for controlling vacuum actuated devices of an internal combustion engine to reduce the emission of pollutants and other noxious gases from the engine.

2. Description of the Prior Art

Multiple port valves have particular utility for conrolling vacuum to vacuum operated devices of an internal combustion engine as is disclosed to a certain extent in U.S. Pat. No. 3,400,698. In this patent, however, the valve is a three port valve in which a vacuum spark advance is selectively connected to two different sources of vacuum in response to a sensed temperature.

Further investigations show that it is desirable to also control an exhaust gas recirculation valve in response to the same temperature conditions as the vacuum spark advance. Simultaneously controlling the vacuum to both the distributor vacuum spark advance and the exhaust gas recirculation valve in response to a predetermined engine temperature, for example, the water temperature in the engine cooling jacket, provides an effective means for controlling engine emission.

SUMMARY OF THE INVENTION

The subject temperature responsive valve includes a valve body having a plurality of axially aligned adjacent chambers extending along at least a portion of a valve body. Each chamber has a port opening in a wall thereof. A valve seat is formed between each adjacent pair of chambers for providing selective communication between the ports of the respective chambers. A valve stem is axially mounted in the body extending through the valve seats and movable along a predetermined path so as to selectively close the respective openings of the valve seats. A temperature responsive actuator is arranged to move the stem between first and second positions, each position providing a selected pattern of communication between the ports of the valve.

In one embodiment the valve has particular utility for communicating first and second ports while simultaneously shutting off communication between third and fourth ports. In a second embodiment the valve simultaneously communicates first and second ports and transfers communication between third and fourth ports to fourth and fifth ports. In a third embodiment the valve controls communication between only first and second ports. In these embodiments the temperature responsive actuator is a fusion type thermal actuator which switches the valve from one position to another at a predetermined temperature.

Among the features of the valve are a low cost valve body having a plurality of aligned chambers with ports communicating with each of the several chambers and valve seats between selected adjacent chambers to be selectively opened and closed in response to the switching or shuttle movement of valve elements which are mounted on the stem for movement with the stem.

Another feature is a unique valve construction with unique valve seat inserts and valve elements on a stem of uniform diameter to provide a valve of inexpensive construction which is easy to assemble and is reliable in operation.

Another feature is a unique valve having the features mentioned above and in which second and third ports are sealed with respect to each other for all operating positions of the valve stem.

Other objects and advantages of the present invention will become apparent from the following detailed description taken in conjunction with the accompanying drawings.

BRIEF DESCRIPTION OF THE DRAWINGS

FIG. 1 is a top plan view of a first embodiment of the multiport valve of this invention;

FIG. 2 is a front elevational view in section taken along line 2—2 of FIG. 1;

FIG. 3 is a top plan view of a second embodiment of the valve of this invention;

FIG. 4 is a front elevational view in section taken along line 4—4 of FIG. 3;

DETAILED DESCRIPTION — FIRST EMBODIMENT

Figure 5:
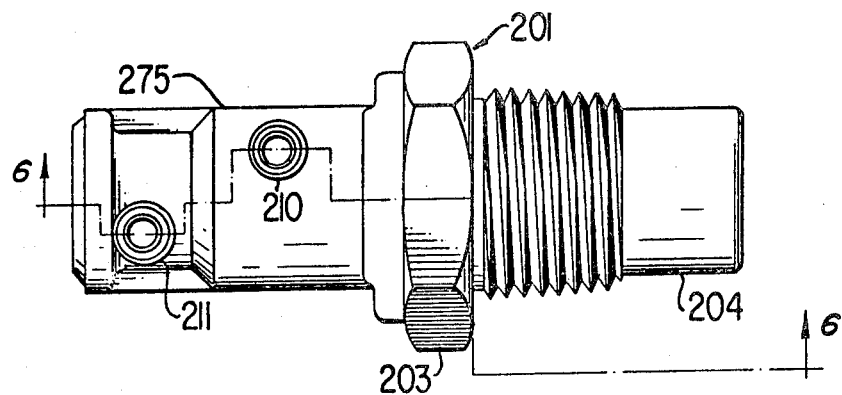
FIG. 5 is a top plan view of a third embodiment of the valve of this invention.

Referring now to the drawings in detail, and particularly to FIGS. 1 and 2, there is shown a valve 1 which is a first embodiment of the valve of this invention. Valve 1 includes a unitary body 2 secured to a base 3 by rolling a side wall of the base over a flange of the body. A fusion type temperature responsive actuator 4 extends through and is secured to base 3 by a flange 5, which is rolled into a groove adjacent the inner end of the actuator housing. One end of base 3 has external threads 6 for mounting the valve. Actuator 4 has a diameter smaller than the base diameter of threads 6 and its temperature sensitive end 7 is exposed when the valve is mounted. Contained within end 7 is a fusable wax 8 which melts and drives piston 9 to the left when the wax is heated to a predetermined temperature. For a detailed description of the temperature responsive actuator 4, attention is directed to U.S. Pat. No. 3,046,787 which is incorporated herein by reference.

Body 2 is of a unitary construction and includes nipples 10–13 having ports 14–17 formed therein which communicate with the interior 18 of valve body 2. Nipples 10–13 are parallel to each other and extend transversely of the valve body.

The interior of body 2 has a series of axially aligned successively smaller counterbores 19–21, and an end bore 22, each of which open toward open end 23 of the valve body. Counterbores 19–21 present transverse annular shoulders 24–26 at the respective ends thereof which face toward end 23 of body 2. As will be apparent with reference to FIG. 2, shoulder 24 is between ports 14 and 15, shoulder 25 is between ports 15 and 16, and shoulder 26 is between ports 16 and 17. Bore 22 has a rounded mouth 27 where it joins shoulder 26.

Located in counterbore 20 is a sleeve 28. Sleeve 28 has a radially extending flange 29, a side face of which rests on shoulder 25 to position the sleeve axially within the body. Flange 29 is substantially thinner than the length of the sleeve 28 and can be press fitted in counterbore 20 to form a seal between counterbores 20 and 21. Sleeve 28 has an axial through bore 30.

Seated in bore 19 against shoulder 24 is a flat disc 31 having a central opening therethrough, the edges of which are rounded, as viewed in longitudinal section at FIG. 2, to provide a valve seat 32 without sharp edges. Disc 31 can be pressed fitted in counterbore 19 relative to counterbore 20 at the periphery of the disc.

Within body 2 is a unitary stem 33 having an elongated section of uniform diameter with annular recesses formed therein. Disposed in the respective recesses are resilient seal elements in the form of O-rings 34–36. Stem 33 has a length to extend from adjacent end 23 of the valve body to bore 22. Bore 22, bore 30, and the opening through seat 32 are of substantially the same diameter and are axially aligned along the rectilinear path of travel of stem 33. The resilient O-ring seals 34–36 each project radially outwardly beyond the outer surface of stem 33 so the respective O-ring seals 34–36 can seal against seat 32, bore 30, and bore 22 while permitting axial movement of the stem through the respective bores and the valve seat 32. As is apparent with reference to FIG. 2, the diameter of stem 33 is less than the diameter of bore 22, bore 30, or the opening through seat 32.

Stem 33 has an enlarged outer end which provides a shoulder 38 facing toward bore 22. A coiled compression spring 39 has a smaller diameter end seated on shoulder 38 and a larger diameter end seated on a side face of disc 31 to normally urge stem 33 toward piston 9. Spring 39 urges end face 40 of stem 33 against fixed end face 41 of actuator 4.

OPERATION – FIRST EMBODIMENT

In use, base 3 is threaded into an opening of, for example, an engine cooling jacket so end 7 of actuator 4 is contacted by the engine cooling water. With the cooling water below a predetermined temperature wax 8 remains solid and spring 39 maintains stem 33 with its end face 40 in engagement with end face 41 of actuator 4. In this position of stem 33 O-ring seal 36 is spaced from both bore 22 and its mouth 27 and, correspondingly, ports 16 and 17 communicate with each other via the chamber defined by counterbore 21 and the chamber defined by bore 22. The chamber defined by bore 21 is sealed relative to the chamber defined by counterbore 20 by the resilient valve element 35 which engages the inner surface of bore 30. Hence, ports 15 and 16 do not communicate with each other. O-ring 34 seals against seat 32 to prevent communication between the chamber defined by counterbore 19 and the chamber defined by counterbore 20. Base 3 seals the open end 23 of valve body 2 and actuator 4 seals the opening through base 3.

When end 7 is heated to a predetermined temperature wax 8 melts and expands to drive piston 9 outwardly to an extended position and piston 9 drives stem 30 to the left as viewed at FIG. 2, to change the axial position of the stem and correspondingly to change the locations of the respective valve elements formed by O-rings 34 and 36. When stem 33 is driven to the left, O-ring 36 first engages mouth 27 of bore 22 and is then moved further into the bore to seal port 16 relative to port 17. simultaneously, stem 33 moves O-ring 34 to a position spaced from valve seat 32 so port 14 communicates with port 15 via the annulus between the outer surface of stem 33 and the opening in valve seat 32. O-ring 35 merely slides in bore 30 and maintains a seal between ports 15 and 16. With the valve stem 33 moved to the left by the extended piston 9, spring 39 maintains the stem in engagement with the end of the piston.

When the temperature of end 7 decreases wax 8 again solidifies and contracts. As the wax becomes solid stem 33 is quickly returned to its initial position by the action of spring 39 which causes end face 40 to seat on end face 41.

A preferred environment for use of the valve is to control vacuum to various control devices of an internal combustion engine. Nipples 10–13 provide a means for connecting vacuum tubing (not shown) to vacuum sources and control devices of an engine. Port 14 can be connected to a first vacuum source 45, port 15 can be connected to an exhaust gas recirculation valve 46, port 16 can be connected to a second vacuum source 47 and port 17 can be connected to the distributor spark advance 48. When so connected, and with stem 33 in the position shown at FIG. 2, vacuum from source 45 to exhaust gas recirculation valve 46 is closed off and vacuum source 47 communicates with vacuum advance 48. When wax 8 melts and moves stem 33 to its second position, vacuum source 45 communicates with exhaust gas recirculation valve 46 and vacuum source 47 is closed relative to vacuum advance 48.

DETAILED DESCRIPTION – SECOND EMBODIMENT

With regard to FIGS. 3 and 4 a second embodiment of the valve of this invention will now be described. In the following description the same numerals plus 100 will be used to designate like parts of the two embodiments.

With reference to FIG. 4, valve 101 has a body 150 connected to a base 103 and an actuator 104 is secured to the base. Nipples 110–113 and 151 define ports 114–117 and 152 which communicate, respectively, with counterbore chambers 119–121, 153, and end bore 154. Since bores 153 and 154 have no corresponding bores in the embodiment of FIG. 1, new numerals plus 100 are used.

Secured in counterbore 119 is insert disc 131 and secured in counterbore 120 is sleeve 128.

Counterbore 153 presents a smooth cylindrical bore which intersects shoulder 126 at a sharp corner. Seated in counterbore 153 is a second sleeve 156 which is elongated and has an end flange 157 which is press fitted in counterbore 121 and seats against shoulder 126. The periphery of flange 157 is sealed relative to chambers 121 and 153. Sleeve 156 is elongated and has an annular outwardly facing groove 158, which extends across the inner end of port 117, and a radial passage 159 communicates groove 158 with a second groove 160 in the inner wall of the sleeve. A bore 161 of smaller diameter than groove 160 opens at one end of sleeve 156 and a second bore 162 opens at the other end of sleeve 156. Adjacent the end of sleeve 156 which is near bore 154 is an annular groove with an O-ring seal 163 therein to seal bore 154 relative to groove 158 along the outside of the sleeve.

Bore 154 connects to bore 153 at a tapered shoulder 164. Stem 165 is substantially longer than the stem 33 of the first embodiment. In addition to the O-ring seals 134–136, there is an additional O-ring seal 166 within bore 162 of sleeve 156. As can be seen with reference to FIG. 4, O-ring seal 166 is adjacent that end of bore 162 which is closest to bore 154.

OPERATION — SECOND EMBODIMENT

A significant difference between valve 1 and valve 101 is that valve 101 has an additional chamber defined by bore 154 and has a port 152 which communicates with the bore. This fifth port 152 is sealed relative to port 117 when actuator 104 is cold, as shown in FIG. 4. However, port 117, in this first position of stem 165, communicates with port 116 via the path including annular groove 158, port 159, groove 160, the annulus between bore 161 and the outside surface of stem 165, and the chamber defined by counterbore 121. In this first position of stem 165, O-ring seal 134 seals against valve seat 132, O-ring 135 seals against bore 130 of sleeve 128, and O-ring 136 is spaced from the flared mouth of bore 161. Correspondingly, port 114 does not communicate with port 115, port 116 communicates with port 117, and port 117 does not communicate with port 152.

When the wax in actuator 104 is heated and melts, piston 109 moves stem 165 to a second position in which the communication among the ports is different. In this second position O-ring 134 is between seat 132 and sleeve 128 and correspondingly port 114 communicates with port 115 via the annulus between the opening in seat 132 and the outside surface of stem 165. Movement of the stem to the second position maintains O-ring 135 in sealing engagement with bore 130 so port 114 is continually isolated from port 116. O-ring 136 has moved into bore 161 so the annulus between the valve stem and bore 161 is sealed and port 116 no longer communicates with port 117. O-ring seal 166 has moved to the left out of the bore 162 so the port 117 communicates with port 152 via the path including annular groove 158, passage 159, groove 160, the annulus between the outside surface of stem 165 and bore 162 and bore 154.

Hence, in addition to communicating ports 114 and 115 and shutting off communication between ports 116 and 117, the valve of FIGS. 3 and 4 also communicates port 117 with port 152. In addition to the connections for the several ports mentioned with reference to FIG. 2, port 152 can be connected to an additional source of vacuum 167 to be communicated to the spark advance which can be connected to port 117.

DETAILED DESCRIPTION THIRD EMBODIMENT

A third embodiment of the valve of the present invention will now be described with reference to FIGS. 5 to 7. The parts of this embodiment which correspond to like parts in the other embodiments will be designated by similar numerals plus 200.

The valve 201 has a body 275 connected to a base 203 and an actuator 204 is secured to the base. Nipples 210 and 211 define ports 214 and 215 which communicate, respectively, with chambers 219 and 276, the latter chamber being closed at one end by plate 277. An annular valve seat 278 is formed between the chambers with a first bevelled or truncated conical surface 279 directed toward chamber 219 and a second bevelled or truncated conical surface 280 directed toward chamber 276.

Stem 281, which is considerably shorter than either stem 33 or 165, is mounted with one end engaging piston 209 of actuator 204 and the other end extending through valve seat 278. An annular seal is provided on the end of the stem adjacent the valve seat and includes a resilient O-ring 283 positioned in annular groove 282 to project radially outwardly beyond the outer surface of the stem so that it can sealingly engage surface 280 of valve seat 278. Coil spring 239 biases stem 281 in the valve closing direction.

OPERATION THIRD EMBODIMENT

Figure 8:
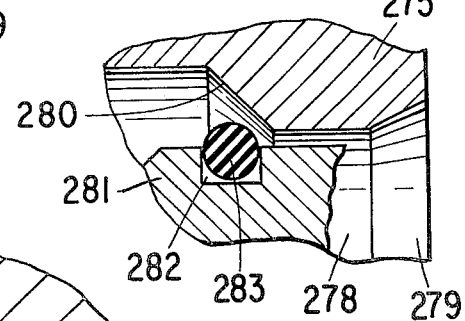
FIG. 8 is another enlarged sectional view of both the valve seat and O-ring in sealing engagement.

The difference in operation between the third embodiment and the previous embodiments is communication between only two ports is involved. The actuator 204, as shown in FIGS. 6 and 8, is cold so that stem 281 is in a first position with O-ring 283 in sealing engagement with surface 280 and valve seat 278. There is no communication between ports 214 and 215 during this condition.

Figure 6:
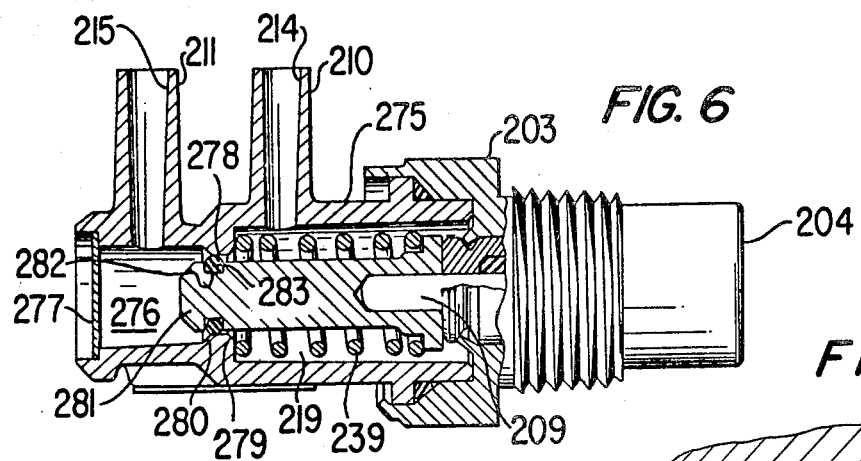
FIG. 6 is a front elevational view in section taken along line 6—6 of FIG. 5.
Figure 7:
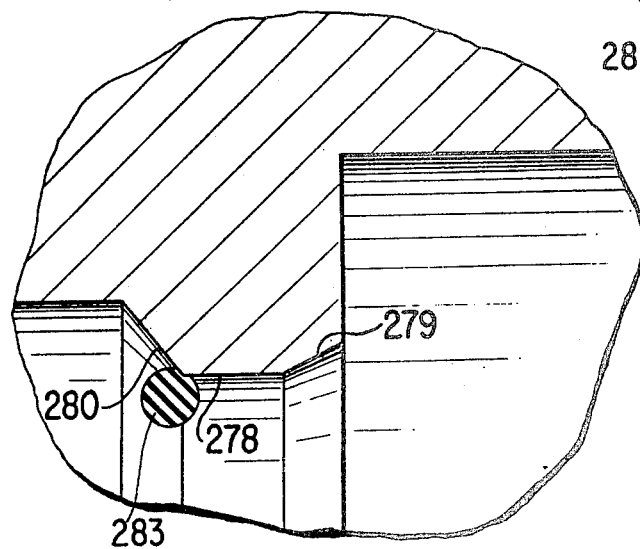
FIG. 7 is an enlarged detail view in section of the valve seat and O-ring of the third embodiment.

When the wax in actuator 204 is heated and melts, piston 209 moves stem 281 to the left, as shown in FIG. 6, against the action of spring 239 from a first to a second position. In this position O-ring 283 is unseated from surface 280 and communication is established between the ports 214 and 215.

ASSEMBLY OF THE EMBODIMENTS

It wll be observed with regard to the first and second embodiments of the valve of this invention that the several counterbores and end bore each open toward a common end of the valve bodies and are of successively smaller size in a direction away from the common end. Such a contruction facilitates successive pressing of sleeve 28 and insert 31 into body 2 of the first embodiment and sleeve 156 and 128 as well as insert 131 into the body 150 of the second embodiment. It is then only necessary to seat springs 39 and 139 on their respective stems 33 and 165 and slip the stem-spring assembly into the body to the positions shown in FIGS. 2 and 4, after which the assemblies including actuators 4 and 104 and bases 3 and 103 are secured to the previously open common end of the respective valve bodies. The third embodiment, because of its simpler construction, is assembled by seating spring 239 and O-ring 283 on stem 281 and slipping the stem into the body 275 to the position shown in FIG. 6. The bevelled surface 279 facilitates the passage of O-ring 283 during this assembly step. The assembly of actuator 204 and base 203 is then secured to the valve body 275 in the same manner as in the previous embodiments.

The respective bodies 2, 150 and 275 are advantageously diecast and the several sleeves and insert can be formed from materials of different hardness to facilitate press fitting these inserts into sealed relation with the respective bores of the body. The several O-rings are formed from a resilient material in a known manner. It is forseen to replace the stem and associated O-rings shown with an integral plastic stem assembly having resilient annular flanges serving as the O-ring seals.

Inasmuch as the present invention is subject to a variety of modifications and changes in details, it is intended that all matter contained in the foregoing description and shown in the accompanying drawings shall be considered as illustrative and not in a limiting sense.

What is claimed is:

1. A temperature responsive valve comprising, in combination
   a valve body having therein first, second, third and fourth cylindrical chambers of successively smaller diameters axially aligned and extending along at least a portion of the length of the body;
   said body including wall means having first, second, third and fourth ports opening respectively into said first, second, third and fourth chambers;
   means defining a first valve seat between said first and second chambers, said first valve seat having an opening therethrough via which said first port can communicate with said second port;
   means defining a second valve seat between said third chamber and said fourth chamber, said second valve seat having an opening therethrough via which said third port can communicate with said fourth port;
   a valve stem within said body and extending through said first valve seat and toward said second valve seat, said stem being movable along a predetermined path;
   a first valve element movable with said stem to close said opening of said first valve seat;
   a second valve element movable with said stem to close the opening of said second valve seat;
   movable means for sealing said second chamber with respect to said third chamber throughout the extent of travel of said stem; and
   a temperature responsive means for moving said stem from a first position, in which said first valve element engages and closes said opening of said first valve seat and said second valve element is spaced from said second valve seat, to a second position in which said first valve element is spaced from said first valve seat and said second valve element closes the opening of said second valve seat.

2. A temperature responsive valve according to claim 1 wherein
   said valve body is of unitary contruction; and
   said first, second, third and fourth ports are defined by nipples integral with the body and projecting therefrom in a direction transversely of the path of travel of said stem.

3. A valve according to claim 1 wherein
   said first and second valve seats have their openings aligned along the path of travel of said stem;
   said stem is a rigid element; and
   said fourth chamber includes a bore defining at least a portion of said valve seat.

4. A valve according to claim 3 wherein
   said means defining said first valve seat includes an insert having an opening therethrough, said insert being disposed between said first and second chambers in sealed relation thereto;
   said first valve element is an O-ring seated in a groove in said stem and movable against said seat to close said opening.

5. A valve according to claim 1 wherein
   said seal means between said second and third chambers include
      a cylindrical bore having a length at least as long as the extent of travel of said stem, and
      a resilient element between said bore and said stem.

6. A valve according to claim 5 wherein
   said cylindrical bore is defined by a sleeve having a diameter less than said third chamber and positioned therein; and
   a radially outwardly extending flange on said sleeve seated in said second chamber in sealed relation to said second and third ports.

7. A temperature responsive valve comprising, in combination;
   a valve body having first, second, third and fourth cylindrical chambers therein of successively smaller diameter and axially aligned with each other and extending along at least a portion of the length of the body;
   said body including wall means having first, second, third and fourth ports communicating respectively with said first, second, third and fourth chambers;
   means defining a first valve seat between said first and second chambers, said first valve seat having an opening therethrough for communcation between said chambers;
   means defining a second valve seat between said third chamber and said fourth chamber, said second valve seat having an opening therethrough via which said third chamber communicates with said fourth chamber;
   a unitary valve stem within said body and extending through said first valve seat and toward said second valve seat;
   a first valve element fixed to said stem to close said opening of said first valve seat;
   a second valve element fixed to said stem and to close said opening of said second valve seat;
   seal means between said second and third chambers surrounding said valve stem and sealing said second chamber with respect to said third chamber throughout the extent of travel of said stem; and
   temperature responsive means for moving said stem from a first position in which said first valve element closes said opening of said first valve seat and said second valve seat is open, to a second position in which said first valve seat is open and said second valve element closes the opening of said second valve seat.

8. A temperature responsive valve according to claim 7 wherein
   said means defining said first valve seat includes a cylindrical element fixed between said first and second chambers and in sealed relation thereto, said cylindrical element having a central opening therein; and
   said first valve element includes a resilient annular element encircling said stem and movable into engagement with said cylindrical element.

9. A temperature responsive valve according to claim 7 wherein
   said means defining said second valve seat includes at least a portion of the cylindrical wall of said fourth chamber, said wall having an outwardly rounded mouth; and
   said second valve element includes a resilient annular element encircling said stem and engagable with said mouth to seal said third chamber with respect to said fourth chamber.

10. A temperature responsive valve according to claim 7 wherein said openings of said first and second valve seats are of substantially the same diameter and are aligned along the path of travel of said stem; and said stem has a diameter smaller than the diameter of said valve seat openings along a portion of its length and extends through said openings;

said first valve element including a resilient annular element encircling said stem and presenting a circumference radially outwardly of said stem;

said second valve element including a resilient annular element encircling said stem and presenting a circumference radially outwardly of said stem;

whereby, said stem is movable through said openings of said first and second valve seats and said first chamber can communicate with said second chamber via the annulus between said stem and the openings of said first valve seat.

11. A temperature responsive valve according to claim 10 wherein said temperature responsive means includes a piston engaging said valve stem adjacent said first chamber; and spring means within said valve body urge said stem toward said piston.

12. A temperature responsive valve according to claim 11 wherein said stem has an enlarged end adjacent said piston; and said spring means is a coil spring encircling said stem and having one end seated on the enlarged end of the stem and another end seated on a surface adjacent said first valve seat.

13. A temperature responsive valve according to claim 10 wherein stop means limits the extent of travel of said stem in a direction toward said piston under the action of said spring.

14. A temperature responsive valve according to claim 7 wherein said seal means between said second and third chambers includes a sleeve in sealed relation with respect to said chambers and having an opening therethrough aligned with the openings of said first and second valve seats, said sleeve having a length at least as great as the extent of travel of said stem, and a resilient annular element surrounding said stem in fixed relation thereto and sealing against said opening throughout the extent of travel of said stem.

15. In a temperature responsive valve, the combination comprising a generally hollow casing having open and closed ends and a plurality of spaced flow ports between the ends, a flow passage in said casing establishing communication between said flow ports, valve seat means in said flow passage, movable valve means cooperating with said valve seat means for controlling a fluid flow in said flow passage, temperature responsive means including a thermostatic power element secured to the open end of said casing and operatively connected to said valve means for moving the same between controlling positions, said valve seat means including an annular surface joined to a first annular bevelled surface with a second annular bevelled surface on the opposite side of the annular surface from the first annular bevelled surface, said first bevelled surface facing in a direction towards the closed end of said casing, said movable valve means including a valve stem having one end operated by said thermostatic power element and a free end protruding through and spaced from said valve seat means, an annular seal ring of resilient material fixed on said free end, and spring means interposed between said stem and said valve seat means biasing the ring into simultaneous engagement with both the first bevelled surface and said annular surface during one of the controlling positions of said element, said first and second surfaces facilitating fluid flow between said stem and annular surface to establish communication between said ports during another one of the controlling positions of said element.

16. A temperature responsive valve according to claim 15 wherein said valve stem has an annular groove adjacent said free end, and said seal ring comprises an O-ring seated in said groove to project radially outwardly beyond the outer surface of said stem for sealing purposes.

17. A temperature responsive valve comprising, in combination a valve body having first, second, third, fourth and fifth chambers therein along at least a portion of the length of the body;

said body including wall means having first, second, third fourth and fifth ports opening, respectively, into said first, second, third, fourth and fifth chambers;

means defining a first valve seat between said first and second chambers, said first valve seat having an opening therethrough via which said first said port can communicate with said second port;

means defining a second valve seat between said third chamber and said fourth chamber, said second valve seat having an opening therethrough via which said third port can communicate with said fourth port;

means defining a third valve seat between said fourth chamber and said fifth chamber, said third valve seat having an opening therethrough via which said fourth port can communicate with said fifth port;

a valve stem within said body and extending through said first, second and third valve seats, said stem movable along a predetermined path;

a first valve element movable with said stem to close said opening of said first valve seat;

a second valve element movable with said stem to close the opening of said second valve seat;

a third valve element movable with said stem to close the opening of said third valve seat;

movable means for sealing said second chamber with respect to said third chamber throughout the extent of travel of said stem; and a temperature responsive means adapted to move said stem from a first position, in which said first valve element engages and closes said opening of said first valve seat, said second valve element is spaced from said second valve seat, and said third valve element closes the opening of said third valve seat, to a second position in which said first valve element is spaced from said first valve seat, said second valve element engages said second valve seat to close the opening thereof, and said third valve element is spaced from said third valve seat;

whereby, in said first position of said stem, said first and second ports are closed relative to each other, said third and fourth ports are open relative to each other and said fourth and fifth ports are closed relative to each other, and in said second position of said stem said first and second ports communicate with each other, said third and fourth ports are closed relative to each other, and said fourth and fifth ports communicate with each other.

18. A valve according to claim 17, wherein said first, second and third valve seats have openings of substantially the same diameter;

said stem is a rigid element of a diameter smaller than said openings in said valve seats; and said valve elements are resilient seals spaced from each other along the length of said stem.

19. A temperature responsive valve comprising, in combination, a valve body having therein first, second, third, fourth and fifth cylindrical chambers of successively smaller diameter and aligned with each other and extending along at least a portion of the length of the body;

said body including wall means having first, second, third, fourth and fifth ports communicating, respectively, with said first, second, third, fourth and fifth chambers;

means defining a first valve seat between said first and second chambers, said first valve seat having an opening therethrough for communication between said first and second chambers;

means defining a second valve seat between said third chamber and said fourth chamber, said second valve seat having an opening therethrough via which said third chamber communicates with said fourth chamber;

a sleeve in said fourth chamber having a bore communicating with said fourth port via a passage in the side wall of said sleeve;

said sleeve including wall means defining a first bore portion defining said second valve seat, and a second bore portion extending between said fourth and fifth ports and defining a third valve seat;

a unitary valve stem within said body and extending through said first valve seat and toward said second valve seat;

first, second and third valve elements fixed to said stem to close said openings of said first, second and third valve seats, respectively;

seal means between said second and third chambers surrounding said valve stem and sealing said second chamber with respect to said third chamber throughout the extent of travel of said stem;

said seal means between said second and third chambers including a sleeve in sealed relation with respect to said second and third chambers and having an opening therethrough aligned with the openings of said first and second valve seats, said sleeve having a length at least as great as the extent of travel of said stem, and a resilient annular element surrounding said stem in fixed relation thereto and sealing against said opening throughout the extent of travel of said stem; and temperature responsive means for moving said stem from a first position in which said first valve element closes said opening of said first valve seat and said second valve element is spaced from said second valve seat, and said third valve element closes the opening of said third valve seat to a second position in which said first valve seat is spaced from said first valve seat, said second valve element closes the opening of said second valve seat, and said third valve element is spaced from said third valve seat.

20. A temperature responsive valve according to claim 16, wherein said casing, said valve seat means, said movable valve means, said spring means and said temperature responsive means are disposed along a common longitudinal axis.

* * * * *